J. B. Slawson.
Fare Box.
No. 550.
Reissued May 4, 1858
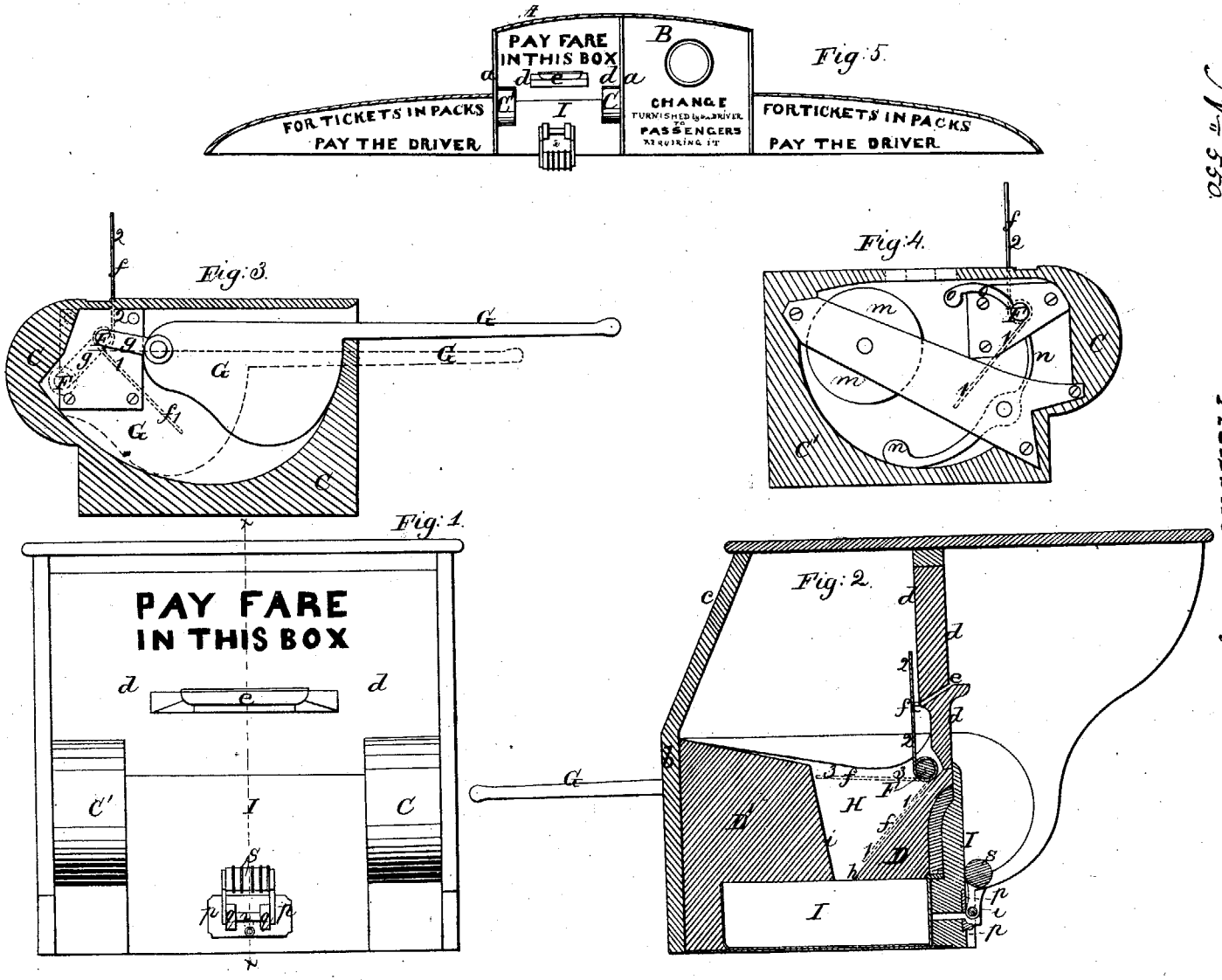
N. PETERS, PHOTO-LITHOGRAPHER, WASHINGTON, D. C.

UNITED STATES PATENT OFFICE.

J. B. SLAWSON, OF NEW ORLEANS, LOUISIANA.

IMPROVEMENT IN BOXES FOR RECEIVING PASSENGERS' FARES.

Specification forming part of Letters Patent No. 17,899, dated July 28, 1857; Reissue No. 550, dated May 4, 1858.

*To all whom it may concern:*

Be it known that I, J. B. SLAWSON, of New Orleans, in the parish of Orleans and State of Louisiana, have invented a certain new and useful apparatus for the prevention of fraud on the part of omnibus-drivers, railroad-conductors, &c., of which the following is a full, clear, and exact description, reference being had to the accompanying drawings, making part of this specification, in which—

Figure 1 represents a front view of the apparatus detached suitable for omnibuses; Fig. 2, a vertical section of the same, taken through the line *x x* of Fig. 1; Fig. 3, a side elevation with the side of the case removed; Fig. 4, a similar view of the other side, and Fig. 5 a vertical transverse section through the top of the stage immediately in front of the apparatus.

This invention consists in the use of a box, of peculiar construction, securely locked and, if necessary, sealed by the employer or his agent, into which it is imperative that the passengers shall drop the exact amount of their fares, this box being so constructed that the money deposited by the passenger shall be temporarily arrested in a chamber, two sides of which must be provided with glass lights suitably arranged for the use of the driver and the passengers, so that both may see into this compartment, the one from the outside and the other from the inside of the omnibus, the former that he may see whether the full amount of the fare has been deposited in good money, and the latter that he is not imposed on by the driver asserting that the full amount has not been paid, and also enabling both to see that more than the full amount has not been deposited, for the effectual carrying out of which the driver is provided with a given amount of money and tickets and charged with the same, so that, should the passengers not be provided with the exact amount of their fare in small money they may apply to him for change, either in money or tickets, as required, which, having received, they then drop the fare or ticket into the chamber above mentioned. This done, and both parties (the driver and passenger) being satisfied that all is correct, the driver then causes it (the fare) to drop into a drawer suitably arranged for its reception, when the box is again ready to receive the fare of the next passenger. By this plan it will be seen that as all access to the fares on the part of the driver is rendered unnecessary for the purpose of furnishing change, and as the passengers are compelled to drop their own fares in the box, that no opportunity is afforded the driver to defraud his employer, seeing that he has to return the full amount of the money and tickets, or the value of the latter in money, on his return with which he was provided when he started.

To prevent any evasion or fraud on the part of the driver, a card is posted in the most conspicuous part of the omnibus notifying the passengers that unless they deposit their fare in the box they will render themselves liable to be called upon for a second fare, as he (the driver) is not authorized to receive it, and that should he take it he will be dismissed. And here it may also be observed that where a passenger has deposited more in the box than the amount of the fare, it will be necessary for him, in the event of his requiring the change, that he ride to the end of the route, where he will find the agent or proprietor of the line, to whom he will state his case, who will then, if satisfied of the truth of the statement, return the change, the driver not being allowed to do it save at his own expense.

To enable others skilled in the art to make, construct, and use my improved fare-box, I will now proceed to describe its parts in detail, reference being had to the accompanying drawings of the same, in which the elevated portion of the top of the stage is represented in Fig. 5 as being divided at or near the middle into two compartments, in one, A, of which is arranged my apparatus for the reception of the fare, and in the other, B, a hole through which the strap passes, that enables the driver to keep the omnibus-door closed, and through which he hands change and tickets to the passengers when required.

My improved apparatus, as arranged in the division above mentioned, may be made of any suitable form so long as it is so constructed as to have two compartments, the one arranged above the other, and the upper one provided with glass sides in such manner that the driver may see through the one from the outside and the passengers from the inside, and with suitable means to prevent the passage of the fare into the chamber below until released by the driver; or they may be arranged in any other suitable manner so long as the fare can be temporarily arrested in the one provided with glass lights previous to its being deposited in the other. In this instance the sides *a a*, which incase the operative parts of the apparatus, are formed by the partition and the side of the elevated portion of the stage before alluded to, and the end next the driver by the front side, *b*, into which is framed a glass light, *c*, so that the driver may be able to see the inside of the box, the inner end of the box being formed by a glass plate, *d*, framed into the sides *a a*, side frames, C and C′, and the front and upper part of the lower compartment, in which is placed the money-drawer. In the glass plate *d* is formed a mouth, *e*, through which the passengers deposit their fare.

The fare, on being deposited into the box through the mouth, is arrested in the progress toward the money-drawer and retained in the upper compartment by any suitable means until the driver has been satisfied that the full fare has been paid in, when he allows it to drop into the drawer below. Once deposited, he allows the arresting plate or apron to close the passage when self-acting, or closes it himself when not. In this instance the fare, on being passed through the mouth *e*, drops down on the arresting-apron *f*, of a size sufficient to close the passage leading into the money-drawer. This apron is secured to an axis formed by a rock-shaft, F, mounted in bearings secured to the side frames, C and C′, in such manner that it may either be turned up or down by means of a crank-shaft, *g*, formed on one end of the rock-shaft F, to the wrist-pin of which is attached the end of a lever, G, the other end of which projects forward through the front end of the stage within convenient reach of the driver. This lever is so weighted that when at rest it will, by virtue of its own gravity, maintain the apron or plate *f* in the proper position for arresting the fare as it is dropped through the orifice *e* of the glass plate. In this position it is suffered to remain until the driver has satisfied himself of its being genuine and of the full amount, when, if correct, he presses the lever G backward, so as to depress the plate *f* until it is in the position shown in dotted line *j′*, (see Figs. 2, 3, and 4,) which permits it (the fare) to drop into a hopper, H, formed by the inclined surfaces *n* and *i* of the end pieces, D and D′, which connect the side pieces, C and C′, together, the hopper thus formed guiding it into the receiving-drawer I, where it remains until it is removed by the owner of the omnibus or the party deputed by him for this purpose. But should the money deposited be spurious, the driver, instead of letting it drop immediately into the drawer I, either leaves it lying on the apron *f* or draws the lever G forward toward him, which turns the apron upward against the glass *d* on the inside of the stage, as shown at $f^2$, Figs. 2, 3, and 4, and calls the attention of the passenger depositing the base money to the fact and again demands his fare in good money, which, on being complied with, is deposited, as before described, in the drawer beneath, thus protecting the omnibus owners from fraud on the part of the passengers. From the foregoing it will be apparent that the same effect may be produced whether the receiving-apron be arranged to close the passage in a horizontal or an inclined position, or whether the apron is arranged and operated in the precise manner above described, or whether of any particular material, so long as it is so arranged as to close and open the passage to the lower compartment without obstructing the view from either end into the upper chamber, for the purpose above mentioned. But as it might so happen that the driver in a hurry might fail to press the lever G sufficiently far back to insure the deposition of the fare in the drawer below, whereby the succeeding passenger, on dropping his in, may claim to have deposited, by accident, more than he really did, and thus impose upon the driver, a bell, *m*, is so arranged on the opposite side of the box (see Fig. 4) as to be struck by a hammer, *n*, at the moment the plate *f* has been sufficiently depressed to drop the fare into the drawer, thus notifying the driver of the fact, this being effected by means of a small lever, *o*, secured to the other end of the rock-shaft that operates the apron, which, as the latter is suddenly turned by the action of the driver on the lever G as he deposits the fare, strikes the upper end of the pivoted hammer *n*, causing its other end to strike the bell with sufficient force to ring the bell *m*, a couple of holes for the escape of the sound being mortised through the upper side of the frame *c′* into the compartment formed for the reception of the bell and its adjuncts.

To prevent the driver or any one else abstracting money from the drawer, it is first locked to the front side of the connecting-piece D, when it may be sealed, if deemed necessary, by the owner or his deputy, after which a plate of metal, *p*, is fitted over it, a couple of mortises being cut in it, through which two lugs or loops, *q*, secured to the outside plate of the lock, pass, through which a bolt, *r*, of a permutation-lock, *s*, is passed so as to double-lock it, the word or numbers requisite to open it being alone known to the owner or his deputy.

From the foregoing description it will be apparent that the apparatus, slightly modified, if necessary, may be applied to railroads, steamboats, &c., and also, instead of being stationary, it may be made portable, if deemed advisable.

Having thus described my invention, what I claim as new, and desire to secure by Letters Patent, is—

A fare-box having two compartments, into one of which the fare is first deposited and temporarily arrested previous to its being deposited in the other, when the former is provided with glass sides so arranged that the passengers can see through one and the driver or conductor through another, in the manner substantially as and for the purposes set forth.

In testimony whereof I hereunto set my hand to this specification.

J. B. SLAWSON.

Witnesses:

ROBT. M. LUSHER,

GILBERT B. TOWLES.